(12) United States Patent
Suka et al.

(10) Patent No.: US 7,185,873 B2
(45) Date of Patent: Mar. 6, 2007

(54) BRACKET MOUNTING STRUCTURE OF PROPELLER SHAFT

(75) Inventors: Teiji Suka, Tochigi (JP); Masaru Naoi, Tochigi (JP); Kazuhiro Iwano, Tochigi (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/094,536

(22) Filed: Mar. 8, 2002

(65) Prior Publication Data

US 2003/0057334 A1 Mar. 27, 2003

(30) Foreign Application Priority Data

Sep. 27, 2001 (JP) .............................. 2001-296980

(51) Int. Cl.
*F16M 13/00* (2006.01)

(52) U.S. Cl. .................... 248/635; 267/141.4; 411/544

(58) Field of Classification Search ................ 248/608, 248/609, 634, 635, 200; 267/140.3, 140.5, 267/141, 141.4, 141.5; 296/35.1; 411/544, 411/353, 352, 516–519

See application file for complete search history.

(56) References Cited

U.S. PATENT DOCUMENTS

| | | | | |
|---|---|---|---|---|
| 382,921 A | * | 5/1888 | Wilcox | 114/114 |
| 2,208,532 A | * | 7/1940 | Woodward | 411/187 |
| 2,361,184 A | * | 10/1944 | Ellis et al. | 248/635 |
| 2,926,881 A | * | 3/1960 | Painter | 267/141.4 |
| 4,014,588 A | * | 3/1977 | Kohriyama | 296/35.1 |
| 4,621,961 A | * | 11/1986 | Gulistan | 411/352 |
| 4,645,190 A | * | 2/1987 | Schad | 267/141 |
| 4,651,839 A | * | 3/1987 | Isobe | 180/68.4 |
| 4,732,519 A | * | 3/1988 | Wagner | 411/337 |
| 4,863,329 A | * | 9/1989 | Wilson | 411/339 |
| 4,995,598 A | * | 2/1991 | Ingham | 267/293 |
| 5,017,328 A | * | 5/1991 | Mazurek | 267/136 |
| 5,080,546 A | * | 1/1992 | Purvin et al. | 411/156 |

(Continued)

FOREIGN PATENT DOCUMENTS

DE 2054998 7/1971

(Continued)

OTHER PUBLICATIONS

U.S. Patent No. 5,743,509 to be used in reference with German Patent DE 19628651.

(Continued)

*Primary Examiner*—Korie Chan
(74) *Attorney, Agent, or Firm*—Orum & Roth LLC

(57) ABSTRACT

In a bracket mounting structure is disclosed for mounting a bracket holding a center bearing of a propeller shaft to a vehicle body member by bolts and nuts. The structure contains a bush collar formed in a cylindrical shape having a flange in an upper end, fitted to the bolts and fixed to the vehicle body member by the bolts and the nuts. It also contains a pair of upper and lower rubber bushes fitted to an outer periphery of the bush collar and gripping the bracket there-between, and a washer provided in a lower end of the lower rubber bush among the rubber bushes. An outer peripheral edge of a lower end of the bush collar extends all through an inner peripheral edge of the washer and is expanded outward in diameter.

8 Claims, 2 Drawing Sheets

U.S. PATENT DOCUMENTS

| | | | |
|---|---|---|---|
| 5,141,203 A * | 8/1992 | Baker et al. | 248/638 |
| 5,174,540 A * | 12/1992 | Gilliam | 248/635 |
| 5,842,677 A | 12/1998 | Sweeney | |
| 6,220,801 B1 * | 4/2001 | Lin | 411/9 |
| 6,491,279 B1 * | 12/2002 | Iwano | 248/635 |
| 6,554,555 B2 * | 4/2003 | Imahigashi | 411/533 |

FOREIGN PATENT DOCUMENTS

| | | |
|---|---|---|
| DE | 19628651 | 1/1997 |
| JP | 739697 | 6/1990 |
| JP | 2589855 | 1/1994 |

OTHER PUBLICATIONS

U.S. Patent No. 3.622.194 to be used in reference with German Patent DE 2054998.

* cited by examiner

BRACKET MOUNTING STRUCTURE OF PROPELLER SHAFT

BACKGROUND OF THE INVENTION

1. Field of the Invention

The present invention relates to a bracket mounting structure for elastically supporting a center bearing provided in a middle portion of a propeller shaft in a motor vehicle to a vehicle body member.

2. Description of the Related Art

A conventional bracket mounting structure includes, for example, structures disclosed in Japanese Utility Model Application Publication No. 7-39697 and Japanese Utility Model No. 2589855. Next, a description will be given of a basic structure of the conventional bracket mounting structure mentioned above with reference to the accompanying drawings.

FIG. 2 is a partly cut-out front elevational view showing one example of a conventional bracket mounting structure which includes a propeller shaft and a center bearing.

A propeller shaft passing under a lower surface of a floor in a motor vehicle is structured such that a middle portion thereof is supported in a rotating manner to a vehicle body member, for example, a cross member via a center bearing and a bracket. As shown in FIG. 2, a center bearing 05 is held within a circular arc portion 01A of a bracket 01 via an outer ring $O_2$, an annular vibration proof rubber 03 and an inner ring 04. A middle portion of a propeller shaft 06 is supported in a rotating manner, by the center bearing 05. Further, the bracket 01 is structured such that plate portions 01B extending rightward and leftward from the circular arc portion 01A are respectively mounted to a cross member 010 of a vehicle body by bolts 07, nuts 08 and washers 09.

FIG. 3 is an enlarged view of the mounting portion of the bracket 01, showing a state of mounting only the mounting portion to the bracket 01 supporting the center bearing 05 while omitting the bolts 07, the nuts 08, the washers 09, and the cross member 010 shown in FIG. 2. A description will be given of the mounting structure of the bracket 01 with reference to both of FIGS. 2 and 3.

First, a cylindrical bush collar 012 having a flange at an upper end is fitted to the bolt 07 mentioned above. The bush collar 012 is fixed to the cross member 010 of the vehicle body by the bolt 07 and the nut 08. A pair of upper and lower rubber bushes 013 and 014 are fitted to an outer periphery of the bush collar 012 so as to grip the bracket 01 there-between, for the purpose of preventing a vibration of the propeller shaft 06 from being transmitted to the cross member 010. Washers 015 and 016 are respectively arranged in an upper end of the upper rubber bush 013 and a lower end of the lower rubber bush 014. A rubber-like material is also partly baked on an upper surface of washer 015 and a lower surface of washer 016. Washers 015 and 016 are surrounded by the rubber bushes 013 and 014. Then, as mentioned above, the whole assembly is mounted to the cross member 010 by the bolt 07.

In this case, at a time of mounting the center bearing 05 to the vehicle body member such as the cross member 010 or the like, at a first stage, the bush collar 012, the rubber bushes 013 and 014, and the washers 015 and 016 are at first assembled in the bracket 01 in which the center bearing 05 is assembled, in an arrangement essentially shown in FIG. 3. At a second stage, they are mounted to the cross member 010 or the like by the bolts 07, the nuts 08 and the washers 09. However, in the arrangement shown in FIG. 3, since the rubber bushes 013 and 014 are fixed to the bush collar 012 only with a fastening dimension of the rubber (that is, only an elastic force of the rubber), there is a risk that the bush collar 012 may drop out from the bracket 01 if the rubber bush 014 drops out from the bush collar 012 due to a light impact or the like during assembling and conveying.

Accordingly, on the assembly line, there is the necessity of carefully assembling while avoiding impact. Further, there is a fear of a shortage of parts. Also, a step to conform that all parts are present must be performed. Although it would be possible to fix the element together by an adhesive agent, in this case, since a degreasing step would be required before applying the adhesive agent, and the reliability of such an adhesive itself is not high, additional countermeasure would be required.

SUMMARY OF THE INVENTION

An object of the present invention is to improve a bracket mounting structure for elastically supporting a center bearing provided in a middle portion of a propeller shaft in a motor vehicle to a vehicle body member.

According to the present invention, there is disclosed a bracket mounting structure for mounting a bracket holding a center bearing of a propeller shaft to a vehicle body member by bolts and nuts. The structure contains a bush collar formed in a substantially cylindrical shape having a flange in an upper end, fitted to the bolts and fixed to the vehicle body member by the bolts and the nuts. It also contains a pair of upper and lower rubber bushes fitted to an outer periphery of the bush collar and gripping the bracket there-between. A washer provided in a lower end of the lower rubber bush among the rubber bushes.

An outer peripheral edge of a lower end of the bush collar extends all through an inner peripheral edge of the washer and is expanded outward in diameter.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

Figure 1A:
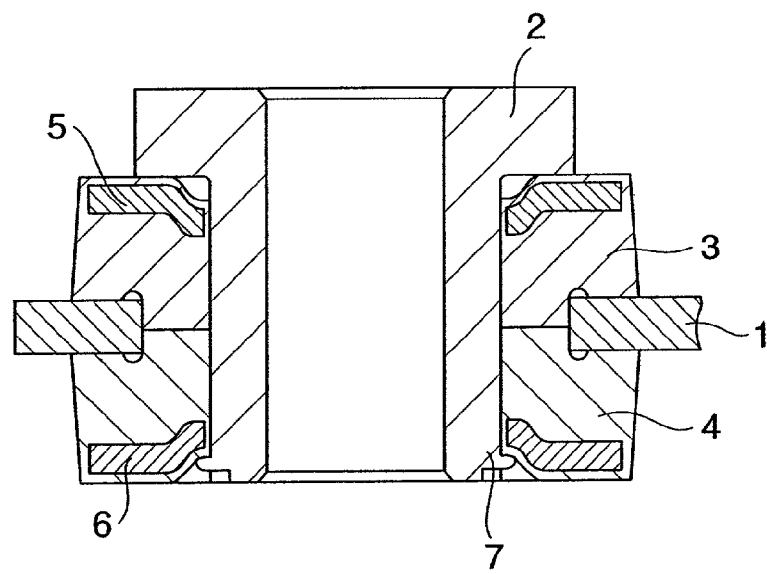
FIGS. 1A and 1B are a vertical cross sectional view and a bottom elevational view showing an example according to the present invention.
Figure 1B:
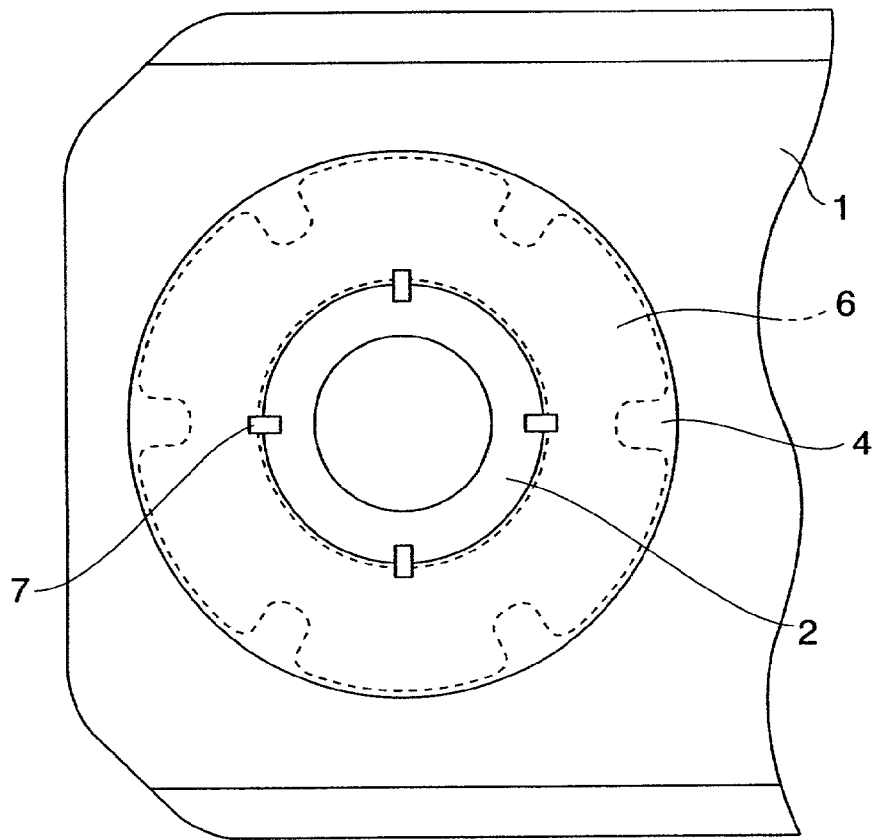
Figure 2:
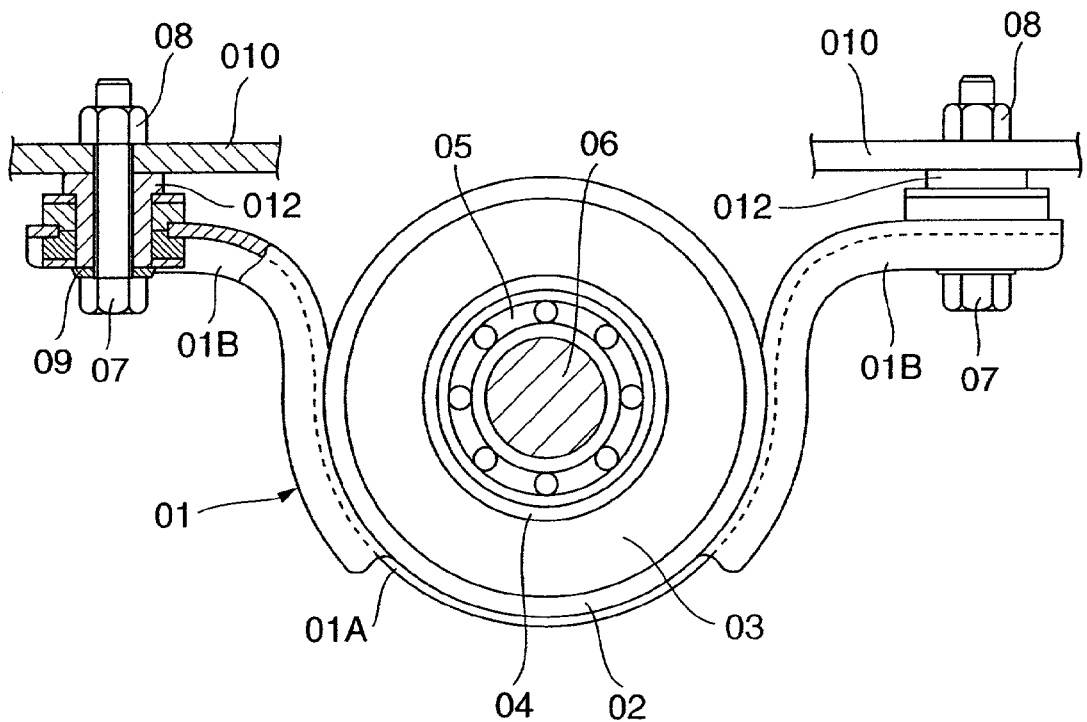
FIG. 2 is a partly cut-out front elevational view showing an example of a conventional bracket mounting structure.
Figure 3:
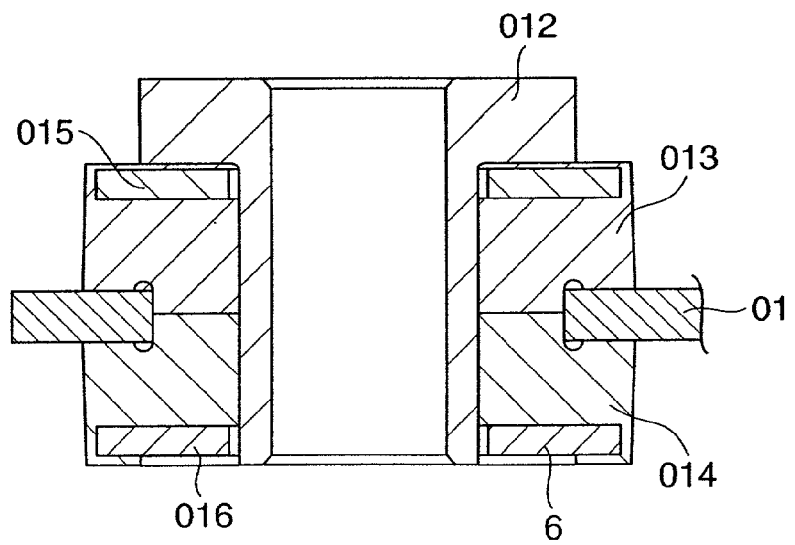
FIG. 3 is a vertical cross sectional view showing a main portion in FIG. 2.

FIG. 1A is a vertical cross sectional view showing an example according to the present invention. FIG. 1B is a bottom elevational view of the same. In these drawings, for convenience of understanding, a vehicle body member, mounting bolts and the like are not illustrated, and there is shown a portion of the device in which only a mounting element is mounted to a bracket, that is, a state corresponding to FIG. 3.

As shown in FIGS. 1A and 1B, according to the present example, in the same manner as the conventional one, a pair of upper and lower rubber bushes 3 and 4 are fitted to an outer periphery of a cylindrical bush collar 2 having a flange at an upper end so as to grip a bracket 1 there-between. Washers 5 and 6 are respectively arranged in an upper end of the upper rubber bush 3 among the rubber bushes and a lower end of the lower rubber bush 4 by being integrally fixed by baking or similar means. An upper surface of the washer 5 and a lower surface of the washer 6 are also surrounded by a rubber-like material, whereby the washers 5 and 6 are in a state of being surrounded by the rubber bushes 3 and 4. Then, the whole of them is mounted to a vehicle body member (not shown) by bolts (not shown).

According to the present example, an outer peripheral edge of a lower end in the bush collar 2 may be caulked outward in a plurality of portions (four portions in an illustrated example) below an inner peripheral edge of the lower washer 6, in a manner shown by reference numeral 7. (All of the periphery may be caulked as the occasion demands. Further, the washer 6 may be independently assembled in place of being integrally baked with the rubber bush 4.) As a result, the washer 6 is mechanically engaged so as to be held in place, and is prevented from coming off. Accordingly, it is possible to securely prevent the rubber bush 4 and the washer 6 from dropping out due to any impact which may be applied during assembling, conveying, and transferring. A shortage of parts can also be prevented. Accordingly, it is possible to design an assembly line without being limited by the conveying and transferring operation, and a freedom of designing the line is increased. Further, it is unnecessary to execute a shortage confirmation step before assembling. It is possible to improve the assembly procedure.

According to the present invention, there is provided a bracket mounting structure for mounting a bracket holding a center bearing of a propeller shaft to a vehicle body member by bolts and nuts. The structure contains a bush collar formed in a substantially cylindrical shape having a flange in an upper end, fitted to the bolts and fixed to the vehicle body member by the bolts and the nuts. It also contains a pair of upper and lower rubber bushes fitted to an outer periphery of the bush collar and gripping the bracket there-between, and a washer provided in a lower end of the lower rubber bush among the rubber bushes. An outer peripheral edge of a lower end of the bush collar extends all through an inner peripheral edge of the washer and is expanded outward in diameter.

Since the present invention is structured in the manner mentioned above and the outer peripheral edge of the lower end in the bush collar extends all through the inner peripheral edge of the washer so as to be expanded outward in diameter, the washer is mechanically engaged by the expanded portion, and a come-off force can be secured against. Accordingly, it is possible to securely prevent the rubber bush and the washer from dropping out at during assembly, conveying, and transferring, and assembly operability is improved. Accordingly, it is possible to make it easy to convey on the line, and freedom of designing the assembly line is increased.

As heretofore explained, embodiments of the present invention have been described in detail with reference to the drawings. However, the specific configurations of the present invention are not limited to the embodiments but those having a modification of the design within the range of the present invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A bracket preassembly adapted to mount a bracket holding a center bearing of a propeller shaft to a vehicle body member by bolts and nuts, the bracket preassembly comprising:
   a bush collar formed in a substantially cylindrical shape having a flange in an upper end, the bush collar fitted to a bolt and adapted to be fixed to the vehicle body member by the bolts and a nuts;
   a pair of rubber bushes fitted to an outer periphery of the bush collar capable of gripping a bracket there between; said pair of bushes partitioned into two portions, an upper rubber bush and a lower rubber bush,
   a first washer having a lower surface, said first washer integrally molded at the lower end of the lower rubber bush,
   said first washer having a recess portion extending above a caulked portion of the bush collar on the inner peripheral side of the first washer and
   the bush collar having a protruding portion which protrudes beyond the lower surface of the washer.

2. The bracket preassembly of claim 1, wherein the washer is fixed by baking in the lower end of the lower rubber bush to be integral therewith.

3. The bracket preassembly of claim 2, wherein an expanded portion of the cylindrical bush collar is wider than the inner peripheral edge of the lower surface of the washer.

4. A bracket preassembly adapted of claim 1 further comprising a second washer provided in an upper end of the upper rubber bush.

5. The bracket preassembly of claim 4, wherein a lower surface of the first washer and an upper surface of the second washer are surrounded by the rubber bushes.

6. The bracket preassembly of claim 4, wherein the first washer is fixed by baking in the lower end of the lower rubber bush to be integral therewith.

7. The bracket preassembly of claim 3, wherein the expanded portion contacts the lower rubber bush to mechanically engage the first washer.

8. The bracket preassembly of claim 4, wherein the first washer is fixed by baking in the lower end of the lower rubber bush to be integral therewith.

* * * * *